United States Patent [19]

Andersen et al.

[11] Patent Number: 4,851,243

[45] Date of Patent: * Jul. 25, 1989

[54] CALCIUM FORTIFIED ASEPTICALLY PACKAGED MILK

[75] Inventors: Delmar L. Andersen, Baldwinsville; David J. Keller, Syracuse; Paul J. Streiff, Camillus, all of N.Y.

[73] Assignee: Borden, Inc., Columbus, Ohio

[ * ] Notice: The portion of the term of this patent subsequent to Oct. 20, 2004 has been disclaimed.

[21] Appl. No.: 105,679

[22] Filed: Oct. 8, 1987

[51] Int. Cl.$^4$ ............... A23C 9/154; A23C 9/156; A23C 9/158

[52] U.S. Cl. ............... 426/74; 426/330.2; 426/547; 426/580; 426/399; 426/42; 426/584

[58] Field of Search ............... 426/580, 584, 586, 72, 426/547, 73, 575, 578, 74, 573, 576, 801, 330, 330.2, 409, 407, 399, 42

[56] References Cited

U.S. PATENT DOCUMENTS 2,871,123  1/1959  Bauer .
3,804,052  4/1963  McLaughlin .
4,701,329  10/1987  Nelson et al. ............... 426/74

FOREIGN PATENT DOCUMENTS 0104696  9/1983  European Pat. Off. .
2089191  12/1981  United Kingdom .
2180733  9/1986  United Kingdom .

Primary Examiner—Marianne Cintins
Attorney, Agent, or Firm—Robbins & Laramie

[57] ABSTRACT

This invention relates to a process for producing shelf-stable aseptically packaged calcium-fortified milk. The aseptically packaged fortified milk is not only characterized by minimal settling of the calcium source, acceptable flavor and acceptable viscosity and mouth feel, but also dairy-case stability and grocery-shelf stability for much more than two weeks. The fortified milk may contain up to 100% of the USRDA of calcium in a cup (8 ounce) serving. It is made by the addition of tri basic calcium phosphate, carrageenan and guar gum to the fresh milk, effecting hydration of the gums and assuring uniform distribution of the added materials in the milk.

48 Claims, No Drawings

CALCIUM FORTIFIED ASEPTICALLY PACKAGED MILK

RELATED APPLICATION

This application is related to an application also assigned to Borden, Inc. and entitled "Calcium Fortified Milk", Ser. No. 827,892, filed Feb. 10, 1986, now U.S. Pat. No. 4,701,329.

FIELD OF THE INVENTION

This invention relates to a process for producing shelf-stable aseptically packaged calcium-fortified milk. In the related application referred to above, Ser. No. 827,892, filed Feb. 10, 1986, there is disclosed a process for preparing a dairy-case stable calcium-fortified pasteurized milk with a dairy-case shelf life of about two weeks. This invention discloses a process for preparing packaged calcium-fortified milk that has a shelf life of much more than two weeks.

BACKGROUND OF THE INVENTION

The need for calcium in our daily diet has been extensively documented in medical and scientific journals. Nutritionists have stressed increasingly the need for calcium in the diet of men and women of all ages as well as children. Recently, attention has been directed toward calcium and its role in preventing osteoporosis, the degenerative bone disease.

Ninety-nine percent of the body's calcium is present in teeth and bones. Calcium is thus needed for both bone formation and maintenance. The other one percent of the body's calcium circulates in the blood and is in part ionized. In its ionized form, calcium is of great importance in blood coagulation, in the function of the heart, muscles and nerves, and in the permeability of membranes. Calcium is also vitally important for normal nerve transmission, muscle contraction, heart function and blood clotting. If adequate amounts of calcium reach the blood from dietary sources, calcium is removed from bones to make up the difference. Current scientific research shows evidence of calcium playing a part in protecting against high blood pressure and colon cancer.

An expert panel on bone health called together by the National Institute of Health summed it up with these words: "In some studies, high dietary calcium supresses age-related bone loss and reduces the fracture rate in patients with osteoporosis". The U.S. Recommended Daily Allowance (R.D.A.) of calcium is 1000 mg. Many adult Americans are consuming lesser amounts of calcium. By increasing the amount of calcium in milk, it will be possible for people to meet more easily the U.S. R.D.A. for calcium. In addition, calcium is best absorbed when accompanied by vitamin D and lactose, both of which are found in milk.

Calcium-enriched food products and particularly calcium-enriched fresh milk have been developed and used from time to time in the past. However, until the development of the product and process of the related application referred to above, Ser. No. 827,892 filed Feb. 10, 1986, calcium-enriched fresh milks have had serious drawbacks. Such prior art milks have lacked stability and have had an off taste. They have not tasted like good fresh milk. In addition, the source of calcium, usually an inorganic salt in finely divided form, has tended to settle out. This renders the calcium content non-uniform unless the milk is shaken and forms a heavy sediment that may be difficult to re-suspend in the milk.

A canned calcium-enriched milk is described in the Bauer U.S. Pat. No. 2,871,123. Calcium carbonate was used as the calcium source and carrageenan gum for suspension. The product was a concentrated milk product which was diluted to make an infant formula.

A calcium-enriched fresh 1% butterfat milk presently sold under the trademark "CalciMilk" by Lehigh Valley Farms contains, according to the label, 66% more calcium than regular low fat milk. This product contains tricalcium phosphate to increase the calcium content, cellulose gel, and carrageenan. It also has lactase enzyme added to break down the lactose in milk. "Shake before serving" is printed on the carbon, indicating that the tricalcium phosphate settles out.

The ability of different individuals to utilize the calcium in food varies considerably. Generally, when an individual partakes of a high protein diet, about 15% of the dietary calcium is absorbed. When the individual partakes of a low protein diet, only about 5% of the dietary calcium is absorbed. Phytic acid in cereal grains interferes with alcium absorption by forming insoluble calcium phytate in the intestine. Oxalates in foods, such as spinach and rhubarb, may have a similar effect.

Other intestinal factors that influence the absorption of calcium include pH, since the more alkaline the contents of the intestines, the less soluble are the calcium salts; the calcium:phosphorus ratio, since a high ratio favors the formation of tricalcium phosphate rather than the more soluble, better absorbed forms; the presence of free fatty acids, which occurs when fat absorption is impaired; and the amount of vitamin D present, since vitamin D promotes the absorption of calcium from the intestine.

Phosphorus is found in every cell in the body, but like calcium, most of it is found in the bones and teeth. About 10% of the total phosphorus in the body is present in combination with proteins, lipids, and carbohydrates, and in other compounds in blood and muscle. Another 10% is widely distributed in a variety of chemical compounds. Phosphate ester is of great importance in energy transfer as is well known.

The metabolism of phosphorus is closely related to that of calcium. The calcium:phosphorus ratio in the diet effects the absorption and excretion of both of these elements. If either element is taken in excess, excretion of the other is increased. The optimal ratio is 1:1 when the intake of vitamin D is adequate.

Given all this background information, it is apparent that the production of stable, consumer-acceptable milk products fortified with calcium and phosphorus would be an important contribution to human nutrition.

The main problem in fortifying a dairy beverage with calcium is suspending or stabilizing the insoluble calcium source so as to prevent its settling out before being consumed. This is important not only as to the product's visual attributes but also from the standpoint of producing a homogeneous product particularly in regard to the calcium content. Developing a system that will stabilize the calcium without drastically increasing the viscosity or changing the flavor was difficult in a pasterurized product. This problem is made more difficult in aseptic milk products due to the expected extended shelf life of six to nine months versus two weeks for the pasteurized product. The related application referred to above has advanced the art by disclosing consumer-acceptable pasteurized fresh milk products fortified with calcium and phosphorus that are dairy-case stable and fresh for about *two weeks*.

This invention solves a problem that has never been solved before. It solves the problem of making a packaged fresh milk that is calcium fortified, that is stable, that is fresh tasting, and that will remain all these good qualities during storage not only for two weeks in the dairy case but also on the grocery shelf for much more than two weeks, generally for six months and longer.

SUMMARY OF THE INVENTION

The word "milk" is used herein in a broad sense. It is used to refer to skimmed milk, lowfat milk, whole milk, filled milk, chocolate milk, and the like, whether in liquid or dried form. Unless specified as dry, however, the term "milk" in the specification refers to liquid milk. In the claims, where the context permits, the term "milk" denotes both liquid and dry milk. The term "milk product", as used herein and in the claims, encompasses products having a milk base, but fortified in accordance with the invention, and formulated with other materials for a specific purpose. That purpose may be human consumption, as would be the case with chocolate milk or lactose-treated milk, but also could be for use in the enrichment with calcium, and preferably also with phosphorus, of baked goods, pet foods, puddings, yogurt, and other such foods where milk is often a component.

The present invention is concerned with an aseptically packaged fortified milk product that provides added calcium and preferably added phosphorus in a suspension-stable, consumer-acceptable form. The product is formed by incorporating in milk, that contains some fat, a very finely divided, insoluble, edible, bland source of calcium, preferably tricalcium phosphate, together with a mixture of two hydrated gums that serve as stabilizing agents. These gums are carrageenan gum and guar gum. Preferably, vitamins are also present, particularly in low fat fortified milks, to enhance with nutritive value.

Kappa carrageenan is a preferred form of carrageenan gum. Generally the carrageenan is present in a slighly greater amount by weight than the guar gum, for optimum results. The presence of fat appears to enhance the action of the carrageenan, so that the amounts of the two gums selected for use may be adjusted in accordance with the fat content of the milk.

According to a preferred embodiment of the invention, the fortified milk is prepared by first forming a preblend of the dry particulate components, namely, the calcium fortifying agent, preferably tricalcium phosphate, carrageenan, and guar gum. To facilitate blending with the milk and the production of more uniform blends, a premix or master batch is formed by mixing the blended dry ingredients with an aliquot portion of the milk that is to be fortified. The premix is then mixed with the remaining milk in a batch tank and allowed to mix for at least 15 minutes to allow the guar gum time to hydrate prior to processing.

The milk mixture is then processed through a UHT sterilization sequence. This insures solubilization and hydration of the carrageenan gum. The milk is then aseptically packaged.

The calcium-fortified milk of this invention may be processed with the UHT sterilization procedures and with the aseptic packaging equipment described in an application assigned to Borden, Inc entitled "Controlled Headspace Gas Packaging of Aseptic Dairy Products", Ser. No. 807,450 filed Dec. 10, 1985 and incorporated herein by reference. The milk-gum mixture of this invention is subjected to indirect UHT sterilization although it is contemplated that direct UHT sterilization can be used.

In the direct sterilization process, the milk or other liquid dairy product is passed through a heat exchanger, generally a heat exchanger of the tubular or plate type. During this heat exchange process, milk is generally passed through a tubular coil that is maintained in a very hot environment, often through the use of superheated steam. Because the heat exchange takes place through the wall of a tube, the heat exchange is less efficient than in the direct process, and the environment about the tube generally is at a very high temperature. After UHT treatment, the milk is passed to equipment which allows the milk to fill a container in a sterilized nitrogen atmosphere which is maintained at about 2 bars. The nitrogen is injected into the system through a nozzle at a pressure of 2.5 bars. The container can be made from tubular stock and the crimping jaws of the equipment actually crimp the package wall together while the milk is between the wall parts that are pressed together.

One type of vertical form, fill, and seal machine that is of the general type that would be used is illustrated in U.S. Pat. No. 3,789,888, the disclosure of which is incorporated here by reference. The tetra-Pak aseptic filling machine is a preferred vertical form, fill and seal machine, but other similar equipment is available and may be used. The invention may also be used for the aseptic filling of preformed open cartons that are carried beneath the fill spout on a conveyor, filled, and then sealed. Suitable valve or other control arrangements may be used to effect continuous operation or intermittent operations, in such a case.

While generally the amount of headspace formed in the closed, aseptically filled container in the following experiments was about 5% to 6% of total container volume, it could be as low as 0%, or as high as something more than 6%. However, it is generally uneconomical to provide a headspace in excess of about 6% of total volume. For stability and for best flavor improvement, the headspace should be in excess of about 2% of total volume, and preferably, 5% to 6% of total volume.

The present invention makes possible the inclusion of insoluble calcium compounds in an aseptically packaged milk with minimal settling and without sacrificing acceptable flavor and mouth-feel. The fortified milk of this invention can be prepared to have acceptable taste; it can be made to taste like good aseptically packaged fresh milk, and it will generally retain its good qualities for at least six months. An 8 ounce serving of whole milk, prepared according to the present invention, can be formulated to provide at least 50% or even more of the U.S. R.D.A. of calcium, and still retain its good milk flavor, and be characterized by good stability. In addition, the fortified milk of the invention can provide a good dietary source of phosphorus.

The process of this invention involves suspensing an insoluble calcium compound in fluid milk utilizing the same two gums used with pasteurized calcium fortified milk described in the related application referred to above. The UHT/aseptic packaging process of this invention allows an approximately 45% reduction in the use levels of these gums when compared with the related application referred to above, while maintaining adequate calcium stabilization in the product after an extended storage period. Lactose reduced milk that has been treated with lactase, an enzyme, has also been used in conjunction with calcium fortification and is included in the invention. It is felt the reduced lactose milk enhances the calcium stabilization, flavor and viscosity of the beverage.

In one embodiment of the invention, milk is fortified with calcium, treated with lactase in order to reduce the lactose present and aseptically packaged. The packaged lasctase-treated calcium fortified milk generally maintains its tood qualities on the grocer's shelf for at least six months.

In another embodiment of the invention, chocolate milk is fortified with calcium and aseptically packaged. The packaged calcium fortified chocolate milk generally maintains its good qualities on the grocer's shelf for at least six months.

In another embodiment of the invention, chocolate milk is fortified with calcium, treated with lactase in order to reduce the lactose present in the chocolate milk, and aseptically packaged.

DETAILED DESCRIPTION OF THE INVENTION

According to this invention, the calcium content of milk is increased by blending into milk an edible, bland, insoluble calcium compound, such as calcium carbonate but preferably tricalcium phosphate, and certain gums that stabilize the mixture. It has been found that by the selection of the gums used, and the use of the proper proportions of two particular gums, the insoluble calcium compound not only remains well suspended in the milk and has flavor, taste, and mouth-feel of good fresh cow's milk but also when aseptically packaged will generally maintain these good qualities for at least six months.

The edible, bland, insoluble calcium compound used for fortification preferably should be finely divided tricalcium phosphate. Other sources of calcium have been evaluated and most have been found wanting for a variety of reasons. For example, calcium citrate and calcium glycerophosphate all have been evaluated and found wanting in one or more respects. Calcium chloride is too bitter. Finely divided tricalcium phosphate and calcium carbonate are each edible, bland, insoluble, and in fine particles sizes are readily formed into suspensions that are acceptably shelf-stable. Tricalcium phosphate enriches the milk with phosphorus, although calcium carbonate, while useful, does not.

The tricalcium phosphate or calcium carbonate preferably is sufficiently finely divided to satisfy a specification of 99% through a 325 mesh U.S. Standard Sieve screen. This means that the maximum particle diameter is not substantially above about 44 micrometers. The term "diameter" is used here in its usual sense when referring to fine particles, to mean the largest dimension, and it does not connote a spherical particle shape. While particles having a maximum diameter not substantially above about 44 micrometers are preferred, somewhat larger particles sizes can be used with acceptable results, although larger particles tend toward less stability. Screening the 44 micrometer product, meeting a specification of 99% through a 325 mesh U.S. Standard Sieve, produces a more uniform batch of particles in size, but does not affect suspension stability. Similarly, even smaller particles than those preferred offer no advantage as to stability of suspension, while generally increasinbg costs, since the finer sizes are usually more expensive.

A proper combination of two stabilizing agents has been found to produce acceptable long term shelf stability. The two agents are carrageenan gum and guar gum, used in specific amounts, with the amount of carrageenan usually being in slightly greater amount by weight than the amount of guar gum. These particular gums were selected after evaluating many stabilizing agents. These gums were selected for their ability to suspend tricalcium phosphate, as well as the other calcium salts that were evaluated, without affecting flavor in a material way. In addition, the particular combination of gums, as used, appears to cause the smallest change in the viscosity of the milk selected for fortification.

The preferred carrageenan gums for use are the kappa carrageenans, the most preferred being a product of Marine Colloids sold under the trademark "SEA-KEM 315". The most preferred grade of guar gum is a product of Dycol, Inc. sold under the trademark "DYCOL 4500 F GUAR GUM". The selected carrageenan and guar gums must be used in combination. Neither gum works satisfactorily alone.

Commercial carrageenan has a molecular weight in the range from 100,000 to 1,000,000, generally. It is not soluble in milk at 20° C. but is at about 80° C. It is available as a powder that ranges in color from white to beige, depending upon the grade. It is a linear polysaccharide made up of repeating galactose units and 3,6-anhydroglactose (3,6 AG). both sulfated and nonsulfated, joined by alternating alpha 1-3, beta 1-4 glycosidic linkages.

The three types of carrageenan that are in common use and commercially available are known as kappa, iota, and lambda. The primary differences that influence the properties of the three types of carrageenan are the number and position of the ester sulfate groups on the repeating galactose units.

The preferred carrageenan gums for use in the practice of the present invention are the kappa carrageenans, and are believed to carry a maximum (average) of a single sulfate substituent group per pair of adjacent rings. The kappa carrageenans generally are approximately 25% ester sulfate and approximately 34% 3,6-AG.

At certain locations on the surface areas of the casein micelle, there is a very strong concentration of positive charges. These positive charges react strongly with the negative charges on the carrageenan. This reaction, in combination with the double helices that tend to occur in aqueous systems, increases the gel strength substantially. It is for this reason that the cocoa in chocolate milk can be suspended with a very small amount of carrageenan, such as, for example, 0.03% by weight. This may also contribute to the success of the systems described in this application.

Guar gum comprises a straight chain of D-mannose with a D-gelactose side chain on approximately every other mannose unit; the ratio of mannose to galactose is 2:1. Guar gum has a molecular weight on the order of 220,000.

Guar gum hydrates in either cold or hot milk to give high-viscosity solutions at low concentrations. Although the viscosity development depends on particular size, pH, and temperature, guar gum at 1% concentration fully hydrates typically within 24 hours at room temperature and in 10 minutes at 80° C., to give viscosities of 3-6 Pa·s (30-60 P), depending upon the grade. Guar gum solutions are stable over the pH range of 4.0-10.5 with fastest hydration occurring at pH 8.0.

Guar gum is compatible with other common plant gums, including the carrageenans. It has useful emulsifying properties. It hydrates rapidly, which is an advantage in the present invention.

In one preferred embodiment of the invention the calcium level of whole milk and lowfat milk is increased from approximately 30% of U.S. R.D.A. per 8 fluid ounces to a product containing a minimum of 50% of U.S. R.D.A. of calcium in an 8 fluid ounce serving. The amount of added tricalcium phosphate required to provide 50% of the U.S. R.D.A. for calcium in an 8 ounce serving is about 0.275% by weight of the milk. There is no harm in exceeding 50%, so preferably a little more is used, which will compensate for any fluctuation in the natural calcium composition of the milk.

The process that is used in preparing fortified milks in accordance with the present invention can be illustrated by describing the way in which the preferred fortified whole milk is produced. First, about 0.315% by weight of tricalcium phosphate is dry blended with about 0.02% of Sea Kem 315 kappa carrageenan gum and about 0.015% of guar gum, all percentages being based on weight of the milk to be enriched. These dry particulate materials are thoroughly blended together, then introduced into an aliquot of the milk. The dry materials and the aliquot of milk are thoroughly mixed together, preferably in a liquefier. Sufficient time is taken to insure substantially complete hydration of the guar gum. The premix is then added to the main residual body of the milk, and the milk is then stirred or agitated to secure a substantially uniform mixture. Generally about 15 minutes of mixing in the liquefier is necessary for hydration of the guar gum to be accomplished and for uniform suspension of the tricalcium phosphate to be made.

Some fat, preferably butterfat, should be present in the milk for the practice of the invention. The presence of butterfat appears to help the carrageenan perform its stabilization task. Generally, as the amount of butterfat is decreased below a value that is generally considered to be standard, that is, 3.25% by weight, the amount of tricalcium phosphate that may be present in the fortified milk, while retaining good suspension-stability, drops off. The invention is therefore not considered applicable to skimmed milk containing essentially no residual butterfat. In preferred embodiments of the invention, the milk contains at least 2% by weight butterfat, and for an enriched (fortified) whole milk, the butterfat content should be at least 3.25%.

To enrich a low fat milk containing about 2% butterfat, for example, the production process is the same as that for the enrichment of whole milk, except for the amount of the tricalcium phosphate employed.

Thus, for making a fortified milk of this invention the allowable ranges for the gums based on the use of 200 gallons of milk are 100 to 210 grams (155 grams preferred) of kappa carrageenan, preferably Sea Kem 315, and 75 to 155 grams (117 grams preferred) of guar gum. The amount of tricalcium phosphate used will depend on the level of fortification desired. When 5.4 pounds of tricalcium phosphate is used to fortify 200 gallons of milk the calcium content of the fortified milk is a little above 500 mg/8 ounces of product, i.e. about 50% R.D.A. The allowable ranges of amounts of the gums used (assuming 200 gallons of milk weigh 1720 lg.) are 0.013%-0.027% for carrageenan gum and 0.0096%-0.0198 for guar gum. The preferred percentages of gums used are 0.0198% carrageenan gum and 0.0150% guar gum.

In one preferred embodiment of the invention for making fortified whole milk, the amounts employed expressed as percentages by weight based on the weight of the milk are tricalcium phosphate, 0.26%-0.85%; kappa carrageenan, preferably Sea Kem 315, 0.01%-0.03%; and guar gum, 0.01%-0.02%, the preferred amount of guar gum being 0.015%. For making fortified low fat milk the amounts employed expressed as percentages by weight based on the weight of the milk are tricalcium phosphate, 0.26%-0.5%; kappa carrageenan, 0.01%-0.03%; guar gum, 0.01%-0.02%, with the preferred amount of kappa carrageenan being 0.02% and the preferred amount of guar gum being 0.015%.

In all the following examples unless otherwise indicated the carrageenan gum used was "SEAKEM 315"; the guar gum was "DYCOL 4500F GUAR GUM"; the milk used was from a shipment of good quality raw milk that had been treated and standardized to the stated butterfat level using a separator; whole milk was vitamin $D_3$ enriched; low fat milk was vitamin A and Vitamin $D_3$ enriched; just before the milk product was aseptically packaged, the product was processed under normal indirect UHT process conditions; during UHT treatment the carrageenan gum present is activated; after UHT processing the milk product was aseptically packaged in 250 ml containers with a 14 ml headspace of nitrogen at 2.0 bar pressure; the nitrogen fill was accomplished at 2.5 bar nozzle pressure; all parts and percentages are by weight and all temperatures are °F.

In these examples, when a milk is stated as having a % R.D.A. this means the % of Recommended Daily Allowance of calcium per 8 ounces of milk product. The Recommended Daily Allowance of calcium is 1000 mg. All of the packaged products were observed and tested at one month intervals during storage. In rating a product, the rating scale of 1 to 9 provides a sacle in which: 1 was a bad product, with bad flavor, and/or dark color, and/or physical changes such as fat separation; 5 was the a product of cutoff point of acceptability; and 9 was the highest rating in quality. Products rated 6-9 are acceptable; products rated below 5 are not acceptable.

Packages were stored either continuously at 40° F. (refrigerator temperature), continuously at room temperature or at 40° F. for two months and thereafter at room temperature.

In all the examples, a batch of milk is 200 gallons of milk unless otherwise noted. In all the examples when a batch of milk is calcium-fortified, it is fortified by the addition of a phosphate-gum blend composed of tricalcium phosphate, carrageenan gum and guar gum. The phosphate-gum blend always contains 155 grams of carrageenan and 117 grams of guar gum. Unless otherwise noted in the example, the phosphate-gum blend contains 5.39# of tricalcium phosphate. This amount of phosphate (5.39#) will enrich milk to at least 50% R.D.A. In Example 1, this amount of tricalcium phosphate enriched the milk to 52.5% R.D.A.

In all examples if the product was lactase-treated, the lactase was added to the flowing milk at the Tetra-Pak station, just prior to the filling of the packages. In the lactase-treating step a lactase solution was introduced into the flowing milk product using a Tetra-pak dose unit. The lactase solution was composed of 1 part lactase, (a neutral lactase which is the product of Pfizer, Inc.) and 99 parts of distilled H₂O. The lactase solution was dosed in at a rate equal to 1 ml. lactase solution to 237 ml milk. Unless otherwise noted, the product was run at 350 gallons/hour.

EXAMPLE 1

Aseptically Packaged Whole Milks Compared: Calcium-Fortified vs. Control

Several 200 gallon batches of whole milk were processed in this example.

The first batch (A) was processed as follows. The phosphate-gum blend was prepared (5.39 pounds of tricalcium phosphate, 155 grams carrageenan and 117 grams of guar gum were blended together). Two hundred gallons of 3.4% butterfat vitamin $D_3$ enriched milk was placed in a liquifier. The phosphate-gum blend was slowly added and mixed into the milk. Mixing was continued for about 15 minutes. The milk was subjected to indirect UHT treatment and then flowed to the Tetra-Pak filler and subsequently filled into 250 ml packages with a 14 ml headspace of nitrogen at 2.0 bar pressure. The packages were divided into 3 groups. One group was stored at 40° F., one group at room temperature, and one group was stored at 40° F. for two months and then stored at room temperature.

The second batch (B), the control, was not calcium-fortified. The second batch was UHT treated, packaged and stored.

All of the packaged, stored products were observed and tested at one month intervals after storage. In rating these products, the rating scale of 1 to 9 described above was used.

The results of the tests run on the stored product are shown in Table 1. The results of the tests demonstrate that the aseptically packaged calcium fortified whole milk of this example was grocery shelf stable and refrigerator shelf stable and consumer acceptable for up to at least 10 months.

EXAMPLE 2

Aseptically Packaged Calcium-Fortified Whole Milk

A batch of whole milk was calcium-fortified with a phosphate-gum blend which contained 5.6 pounds of tricalcium phosphate; UHT treated; packaged and stored.

The results of the tests are shown in Table 1. The results demonstrate that the aseptically packaged calcium fortified whole milk was grocery shelf stable, refrigerator shelf stable and consumer acceptable for up to at least 10 months.

EXAMPLE 3

Aseptically Packaged Lactase Treated Whole Milks Compared: Calcium-Fortified vs Control Two batches of whole milk were processed in this example.

The first batch (A) was calcium-fortified; UHT treated; lactase-treated; packaged and stored.

The second batch (B), the control, was not calcium enriched. The second batch was UHT treated, lactase-treated; packaged and stored.

The results of the tests run on the stored product are shown in Table 1. The results of the tests demonstrate that the aseptically packaged calcium-fortified lactase-treated whole milk of this example was grocery shelf stable and refrigerator shelf stable and consumer acceptable for up to at least 9 months. The results show that over time the calcium-fortified lactase milk appeared to have keeping qualities that were somewhat superior to those of the non-fortified lactase-treated milk.

EXAMPLE 4

Aseptically Packaged Whole Milks Compared: Calcium-Fortified Milk vs Lactase-Treated Milk vs Calcium-Fortified, Lactase-Treated Milk Three batches of whole milk were processed in this example.

The first batch (A) was calcium-enriched with a phosphate-gum blend which contained 5.6 pounds of tricalcium phosphate; UHT treated; packaged and stored.

The second batch (B) was not calcium-enriched. The second batch was UHT treated, lactase-treated with the product run at 435 gallons/hour; packaged and stored.

The third batch (C) was calcium-enriched with a phosphate-gum blend which contained 5.6 pounds of tricalcium phosphate; UHT treated with the product run at 435 gallons/hour; lactase-treated packaged and stored.

The results of the tests run on the stored product are shown in Table 1. The results of the tests demonstrate that all three products of this example (i.e. aseptically packaged Calcium Fortified Whole Milk; aseptically packaged Lactose-Treated Whole Milk and aseptically packaged Calcium Fortified Lactase-Treated Whole Milk) were grocery shelf stable and refrigerator shelf stable and consumer acceptable for at least six months. The (A) product of this example, that was not lactase-treated, was acceptable for at least 11 months; this result agrees with the results of the testing of Example 2A.

EXAMPLE 5

Aseptically Packaged Lactase Treated Milks Compared: Calcium-Fortified Whole Milk vs Whole Milk vs Calcium-Fortified Low Fat Milk In this example, two batches of whole milk and one batch of low fat milk were processed.

The first batch of whole milk (A) was calcium-fortified with a phosphate-gum blend which contained 5.6 pounds of tricalcium phosphate; UHT treated; lactase-treated; packaged and stored.

The second batch of whole milk (B), which was not calcium-fortified, was UHT treated; lactase-treated; packaged and stored.

The batch of low fat milk (C), was calcium fortified with a phosphate-gum blend which contained 5.6 pounds of tricalcium phosphate; UHT treated; lactase-treated; packaged and stored.

The results of tests run on the three batches are shown in Table 1. The results of the tests show that the aseptically packaged lactase treated milk products of this example were grocery shelf stable, refrigerator shelf stable and consumer acceptable for at least ten months.

EXAMPLE 6

Aseptically Packaged Chocolate Milks Compared: Lactase-Treated vs Calcium-Fortified Lactase-Treated vs Calcium-Fortified In this example, two 193 gallon batches and one 189 gallon batch of low fat milk (2.1% butterfat) were processed to make a chocolate milk product.

The first batch (A) as a first step, was formulated in a way that it is normal to formulate chocolate milk as follows.

A mixture of 141 gram of carrageenan (SeaKem 6M614), and 81.95 pounds of sugar and a mixture of 17.7 pounds of cocoa, 812 ml of vanilla, and 1.06 pounds salt were added to the batch of milk, (193 gallons of 2.1% milk) and mixed for 10–15 minutes.

After being formulated the chocolate milk was UHT sterilized; lactase-treated, packaged and stored.

The second batch (B) was formulated into chocolate milk in the normal way as described in (A) except that 5.6 pounds of tricalcium phosphate was added to the formulation. The chocolate milk was UHT treated, lactase-treated with the product run at 435 gallons/hour, packaged and stored.

The third batch (C) was formulated into chocolate milk in the normal way as described in (A) except that 5.6 pounds of tricalcium phosphate was added to the formulation and except that 189 gallons of milk was used instead of 193 gallons of milk. The chocolate milk was UHT treated, packaged and stored.

In these examples, no guar gum was used. In these examples the carrageenan used was the kind and the amount that is normally used in chocolate milk to aid in the suspension of the cocoa particles.

The results of tests run on the products of this example are shown in Table 1. The results show that the aseptically packaged chocolate milk; the aseptically packaged calcium-fortified lactase-treated chocolate milk and the aseptically packaged calcium fortified chocolate milk were grocery shelf stable, refrigerator stable and consumer acceptable for at least six months.

EXAMPLE 7

Aseptically Packaged Calcium-Fortified Chocolate Milk and Aseptically Packaged Calcium-Fortified Lactase-Treated Chocolate Milk In this example a 187 gallon batch of 2.1% milk, (A) was formulated to chocolate milk in another normally accepted way except that phosphate-gum blend was added to the formulation as follows.

Phosphate-gum blend containing 5.4 pounds of tricalcium phosphate was mixed into a blend of 1624 pounds of 2.1% milk, 124 pounds sugar, 17.7 pounds cocoa powder, 812 ml vanilla, 1.75 pounds natural butter flavor, 1.06 pounds salt and 12.6 grams of carrageenan (SeaKem CM614). The mixture was blended for 15 minutes and then subjected to indirect UHT treatment, packaged and stored.

In this example another batch of chocolate milk (B) was formulated as described above except that the calcium fortified chocolate milk was lactase-treated before being packaged and stored.

The results of the tests run on the stored product are shown in Table 1. The results show that the aseptically packaged calcium-fortified chocolate milk in which the gum in regular chocolate milk was augmented by the addition of the phosphate gum blend of this invention was grocery shelf stable and refrigerator shelf stable and consumer acceptable for up to at least seven months. The results show that aseptically packaged calcium-fortified lactase-treated chocolate in which the gum in regular chocolate milk was augmented by the addition of the phosphate blend of this invention was grocery shelf stable and refrigerator stable and consumer acceptable for up to at least 8 months. When compared to the results of example 6, it is concluded that the shelf life of calcium fortified chocolate milk is improved by the addition of the phosphate gum blend in accordance with this invention.

EXAMPLE 8

Aseptically Packaged Calcium-Fortified Low Fat Milk

A 195 gallon batch of 2% milk was calcium-fortified with a phosphate-gum blend which contained 5.4 pounds of tricalcium phosphate; UHT treated, packaged and stored.

The results of the tests run on the stored product are shown in Table 1. The results demonstrate that the calcium-fortified low fat milk product was grocery shelf stable and refrigerator shelf stable and consumer acceptable for up to ten months.

EXAMPLE 9

Aseptically Packaged Low Fat Milks Compared: Calcium-Fortified vs Control

Two batches of 2% milk were processed. The first batch (A) was calcium-fortified with a phosphate-gum blend which contained 5.6 pounds of tricalcium phosphate, UHT treated, packaged and stored. The second batch (B), the control, was UHT treated, packaged and stored.

The results of tests run on the stored product are shown in Table 1. The results of the tests show that the aseptically packaged calcium-fortified low fat milk of this example was grocery shelf stable, refrigerator shelf stable and consumer acceptable for at least six months.

EXAMPLE 10

Aseptically Packaged Lactase-Treated Low Fat Milks Compared: Calcium-Fortified vs Control In this example, two batches of 2% milk were processed. When the product of this example was packaged the nitrogen was filled into the headspace at 1.8 bars instead of the usual 2.0 bars.

The first batch (A) was calcium-fortified with a phosphate-gum blend, UHF treated, lactase-treated packaged and stored.

The second batch (B), the control, was UHT treated, lactase-treated, packaged and stored.

The results of the tests run on the stored product are shown in Table 1. The results of the tests show that the aseptically packaged lactase-treated low fat milk and the aseptically packaged calcium-fortified lactase-treated low fat milk of this example were grocery shelf stable and dairy case stable and consumer acceptable for at least seven months.

EXAMPLE 11

Aseptically Packaged Lactase-Treated Low Fat Milks Packaged With No Headspace: Calcium-Fortified vs Control In this example, two batches of 2% milk were processed. The first batch, A, was calcium-fortified with a phosphate-gum blend; UHT treated; lactase-treated; packaged with no headspace (i.e. the 250 ml packages were completely filled with product) and stored. The second batch, B, the control, was UHT treated; lactase-treated; packaged with no headspace and stored.

The results of the tests run on the stored products are shown in Table 1. The results of the tests show that the aseptically packaged lactase treated low fat milk product packaged with no headspace and the aseptically packaged calcium-fortified lactase-treated low fat milk product packaged with no headspace were grocery shelf stable and dairy case stable and consumer acceptable for at least seven months.

EXAMPLE 12

Aseptically Packaged 70% R.D.A. Calcium-Fortified Milks and Aseptically Packaged 100% R.D.A. Calcium-Fortified Milk In this example, two batches of 2% milk were processed and two batches of whole milk were processed.

The first batch of 2% milk, A, the control, was UHT treated; packaged and stored.

The second batch of 2% milk, B, was calcium-fortified to about 70% R.D.A. with a phosphate-gum blend containing 11.2 pounds of tricalcium phosphate 163 grams of carrageenan and 117 grams of guar gum; UHT treated; packaged and stored.

The first batch of whole milk, C, the control, was UHT treated; packaged and stored.

The second batch of whole milk, D, was calcium-fortified to about 100% R.D.A. with a phosphate-gum blend containing 11.2 pounds of tricalcium phosphate, 163 grams of carrageenan and 117 grams of guar gum; UHT treated; packaged and stored.

Results of the tests run on the products of these examples are shown in Table 1. The results show that the 70% R.D.A. calcium-fortified 2% milk product was shelf stable and consumer acceptable for at least seven months and that the 100% R.D.A. calcium-fortified whole milk product was shelf stable and consumer acceptable for at least five months.

TABLE 1
MONTHLY PRODUCT EVALUATION OF ASEPTIC PACKAGED MILK PRODUCT DURING STORAGE

| Example | Storage Temp °F. | % Fat In Milk | Pounds of TCP/200 gal | NOTES | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|---|
| 1A | 40° | 3.40 | 5.39# | 52.5% RDA | 8 | 8 | 7½ SS | 7½ | 7½ | 7½ | 7½ | 7½ | 7 | 7 | 6½ | 6 | 6 | |
|  | RT | 3.40 | " | " | — | 8 | 7½ | 7½ | 7½ | 7½ | 7½ | 7½ | 7 | 7 | 6½ | 6 | | |
|  | 40°/RT | 3.40 | " | " | 8 | — | 7½ | 7½ | 7½ | 7½ | 7½ | 7½ | 7 | 7 | 6½ | 4 | | |
| 1B | 40° | 3.40 | — | " | 8 | 8 | 7½ | 7½ | 7½ | 7½ | 7½ | 7½ | 7½ | 7 | 6½ | 5½ | 5½ | |
|  | RT | 3.40 | — | " | — | 8 | 8 | 8 | 8 | 8 | 8 | 8 | 7½ | 6 | 6½ | 4 | | |
|  |  |  |  |  |  |  |  |  | FS |  |  |  |  |  | 5½ |  |  |  |
|  | 40°/RT | 3.40 | — | — | — | — | 8 | 8 | 7 | 7 | 7 | 7 | 6½ | 6 | 5 | | | |
| 2A | 40° | 3.40 | 5.6# | — | 8 | 8 | 8 | 8 | 7 FS | 8 | 7½ | 7 | 6½ | 5½ | 5 | | | |
|  | RT | 3.40 | " | — | — | 8 | 8 | 8 | 8 | 8 | 7½ | 7½ | 7½ | 7½ | G | | | |
|  | 40°/RT | 3.40 | " | — | 8 | 8 | 8 | 8 | 8 | 8 | 7½ | 7½ | 7½ | 6½ | | | | |
| 3A | 40° | 3.40 | — | lactase treated | — | — | 8 | 8 | 8 | 8 | 7½ | 7½ | 7½ | | | | | |
|  |  | 3.4 | — | " | 8 VLH | 8 VLH | 8 | 8 | 7 NS | 7 NS | 6 | 5½ FP | 5 | G | | | | |
|  | RT | 3.4 | — | " | 8 VLH | 8 VLH | 8 CS | 8 | 7 | 7 S | 6 | 5½ FP | 5 | G | | | | |
|  | 40°/RT | 3.4 | — | " | — | — | — | — | — | — | — | — | — | — | | | | |
| 3B | 40° | 3.4 | — | " | — | 7½ CS | 7 FS | 7 | 7½ NS | 7 | 6 FP | 5½ | 5 G | 5½ | | | | |
|  | RT | 3.4 | — | " | 8 | 8 | 7 | 7 | 7 | 7 | 7 | 6½ | 6 | 5 CS | | | | |
|  | 40°/RT | 3.4 | — | " | 8 | 8 CS | 8 CS | 8 | 8 | 7 | 7 | 6 B | 6 | 5 CS | | | | |
| 4A | 40 | 3.40 | 5.6# | — | 8 | 8 | 8 | 8 | 8 | 7 | 7 | 7 | 7 | 7 | 7 | | | |
|  | RT | 3.40 | " | — | 8 | 7 CS | 7 | 7 | 7 | 7 | 7 | 7 | 7 | 7 | 7 | | | |
|  | 40°/RT | 3.40 | " | — | — | — | — | — | — | — | — | — | — | — | | | | |
| 4B | 40° | 3.4 | — | lactase treated | 8 | 8 | 8 | 8 | 7½ | 7 | 7 | 7 | 7 | 7 | 7 | | | |
|  | RT | 3.4 | — | " | 8 | 7 B | 7 | 7 | 6½ | 6½ | 6½ | 6 | 6 | 6 | 5½ | | | |
|  | 40°/RT | 3.4 | — | " | — | — | — | — | — | — | 4 | — | — | — | | | | |
| 4C | 40° | 3.4 | 5.6# | lactase treated | 8 | 7 CS | 7 | 7½ | 6½ | 6½ | 6½ | 5½ FS | 5 FS G | 5 CS | 6½ | | | |
|  | RT | 3.4 | " | " | 8 | | 7 B | 7 B | 7 | 6 | 4 | 6½ | 6½ | 6½ | | | | |
|  | 40°/ | | | | | | | | | | | | | | | | | |

TABLE 1-continued

MONTHLY PRODUCT EVALUATION OF ASEPTIC PACKAGED MILK PRODUCT DURING STORAGE

| Example | Storage Temp °F. | % Fat In Milk | Pounds of TCP/200 gal | NOTES | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|---|
| 5A | RT | 3.4 | " | " | — | — | 7 | 7 | 7 | 6½ | 6½ | 6½ | 6½ | 6½ | 6½ | | | |
|  | 40 | 3.4 | 5.6# | lactase treated | 8 | 8 | 8 | 8 | 8 | 8 | 7½ | 7½ | 7½ | 7½ | | | | |
|  | RT |  |  | " |  | 8 | 8 | 8 | 8 | 8 | 7 | 7 | 7 | 7 | | | | |
|  | 40°/RT |  |  |  |  |  |  |  |  |  |  |  |  |  |  |  |  |  |
| 5B | RT | " | " | " | 8 | 8 | 8 | 8 | 8 | 8 | 7½ | 7½ | 7½ | 7½ | | | | |
|  | 40 | 3.4 | no | lactase treated | 8 | 8 | 8 | 8 | 8 | 8 | 7½ | 7½ | 7½ | 5½ | | | | |
|  | RT | " | " | " | — | 7 SB | 7 | 7 | 7 | 7 | 6½ FS | 6½ | 6½ | 5½ G | | | | |
|  | 40°/RT |  |  |  |  |  |  |  |  |  |  |  |  |  |  |  |  |  |
| 5C | 40° | 2.0 | yes, 5.6# | lactase treated | 8 | 8 | 8 | 8 | 8 | 8 | 7½ | 7½ | 7½ | 5½ | | | | |
|  | RT | " | " | " | — | 8 SB | 8 | 7½ | 7½ | 7½ | 6½ CS | 6 | 6 | 5½ CS | | | | |
|  | 40°/RT |  |  |  |  |  |  |  |  |  |  |  |  |  |  |  |  |  |
| 6A | 40 | 2.1 | — | chocolate milk lactase treated | 8 | 8 | 8 | 8 | 8 | 8 | 6½ CS | 6 | 6 | 5½ CS | | | | |
|  | RT | " | — | " | — | 8 | 8 | 7½ | 7½ | 7½ | 7½ | 7 | 7 | 7 | | | | |
|  | 40°/RT |  |  |  |  |  |  |  |  |  |  |  |  |  |  |  |  |  |
| 6B | 40 | 2.1 | yes, 5.6# | chocolate milk lactase treated no additional gums | 8 | 8 SOB | 8 | 8 | 8 | 8 | 7½ 7 CPOG | 7 7 | 7 7 | 7 | | | | |
|  | RT | " | " | " | — | 8 SOB | 8 | 8 | 8 | 7 CPOG | 6 | 5½ CCS | 5 CCS | | | | |
|  | 40/RT | " | " | " | — | — | " | " | " | " | " | " | " | " | | | | |
| 6C | 40 | 2.1 | 5.6# | chocolate milk no additional gums | 8 | 8 SOB | 8 | 8 | 8 | 7 CPOG | 6 CPOG | 5½ CCS | 5 CCS | 5½ CCS | CCS | | | |
|  | RT | " | " | " | — | 8 SOB | 8 | 8 | 8 | 7 | 7 CPOG | 7 | 7 | | CCS | | | |
|  | 40/RT | " | " | " | — | — | " | " | " | " | " | " | " | " | | | | |
| 7A | 40 | 2 | 5.4# | chocolate milk | 8 | 8 | 8 SF | 8 | 8 | 8 | 8 | 8 | CCS | CCS | CCS | | | |
|  | RT | " | " | " | 8 | 8 | 8 | 8 | 8 | 7 | 7 | 5½ | 5 | | | | | |

TABLE 1-continued
MONTHLY PRODUCT EVALUATION OF ASEPTIC PACKAGED MILK PRODUCT DURING STORAGE

| Example | Storage Temp °F. | % Fat In Milk | Pounds of TCP/200 gal | NOTES | Rating of Samples Months in Storage | | | | | | | | | | | | | |
|---|---|---|---|---|---|---|---|---|---|---|---|---|---|---|---|---|---|---|
| | | | | | 1 | 2 | 3 | 4 | 5 | 6 | 7 | 8 | 9 | 10 | 11 | 12 | 13 | 14 |
| | 40/RT | " | " | | | | SF | | | | | COG | | | | | | |
| 7B | 40° | " | " | Chocolate milk, lactase-treated | 8 | 8 SD | 8 SF 8 | 8 | 8 | 8 | 8 | 5½ COG | 5 | | | | | |
| | RT | " | " | " | 8 | 8 SD | 8 | 8 | 8 | 7 CPOG | 7 | 7 | 7 | | | | | |
| | 40°/RT | " | " | | — | — | 8 | 8 | 8 | 8 | 6 | 5½ CCS | 5 CCS | | | | | |
| 8A | 40° | 2 | 5.4# | | 8 7½ SSOC | 8 7½ SSOC | 8 7½ | 8 7½ | 8 7½ | 8 7½ | 8 7½ | 8 7½ CCS | 8 7½ CCS | 6 5½ CS | 5½ 5 | 5 | | |
| | 40°/RT | " | " | | — | — | | | | | | | | | | | | |
| 8B | 40° | 2 | — | | — | — | 8 | 8 | 6 G 7 | 6 | 7 | 8 CCS | 8 CC | 5½ CS | 5 | | | |
| | RT | " | — | | 8 | 7 | 7 | 7 | 7 | 7 | 6½ | 6½ | 6½ | 6 G | 5½ G | | | |
| | 40°/RT | " | " | | — | — | 8 | 7 | 7 | 7 | 7 | 7 | 7 | 6½ | 5½ G | | | |
| 9B | 40° RT | 2 " | 5.6# " | | 8 | 8 | 8 8 | 7½ 7½ B | 7½ 7½ | 7½ 7½ | 7½ 4 | 5½ CC 6 | 5½ CC | 5 | 5½ G | | | |
| | 40°/RT | " | " | | — | — | 8 | 8 | 8 | 7 | 7 | 6 | | | | | | |
| 10A | 40° | 2 | — | lactase treated, packages nitrogen filled at 1.8 bars | 8 | 8 | 8 | 5½ B | 5½ | 5½ | 5½ | 5 | | | | | | |
| | RT | " | — | " | — | — | 8 | 5½ B | 5½ | 5½ | 5½ | 5 | | | | | | |
| | 40°/RT | " | — | | — | — | 8 | 8 | 8 | 8 | 7 | 6 M | 6 | | | | | |
| 10B | 40° | 2 | 5.39# | lactase treated packages nitrogen filled at | | | | | | | | | | | | | | |

TABLE 1-continued

MONTHLY PRODUCT EVALUATION OF ASEPTIC PACKAGED MILK PRODUCT DURING STORAGE

| Example | Storage Temp °F. | % Fat In Milk | Pounds of TCP/200 gal | NOTES | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|---|---|
| | RT | " | " | " | 1.8 bars | 8 | 8 | 8 | 8 | 8 | 8 | 7 | 6 M | 5 | | | | |
| | 40°/RT | " | " | " | " | — | — | 8 | 7 B | 7 | 7 | 6 | 5½ B | 5 | | | | |
| 11A | 40 | 2 | — | lactase treated no head-space | 7 C | 6 * | 5½ FS | 5½ VS | 5½ | 5½ | 5½ | 5½ | 5½ | 5 | | | | |
| | RT | " | " | " | " | 7 C | 6 MF | 5½ FS | 5½ VS | 5½ | 5½ | 5½ | 5 | | | | | | |
| | 40°/RT | " | " | " | " | — | — | 5½ FS | 5½ VS | 5½ | 5½ | 5½ | 5½ | 6½ | 5 | | | |
| 11B | 40 | " | yes, 5.39# | | | 8 | 7½ | 7½ | 7½ | 7½ | 7 | 7 | 6 BC | 6½ | 4 | | | |
| | RT | " | " | " | | 8 | 7½ | 7½ | 7½ BC | 7½ | 7 | 7 | 6 BC | 5½ | 4 | | | |
| | 40°/RT | " | " | " | | — | — | — | 7½ BC | 8 | 7 | 7 | | | | | | |
| 12A | 40 | 2 | — | | | 8 | 8 | 8 | 8 | 8 | 8 | 8 | | | | | | |
| | RT | " | — | | | 8 | 8 | 8 | 8 | 7 | 7 | 7 | | | | | | |
| | 40°/RT | " | | | | 8 | 7½ | 7½ | 8 | 7 | 6 | 6 | | | | | | |
| 12B | RT | " | 70% RDA/8 oz | | | 8 | 7 | 6½ SS | 7½ BC | 6½ | 5½ CS | 5 CS | | | | | | |
| | 40°/RT | " | " | | | — | 7 | 7 SS | 7 | 7 | 6 | 5½ | | | | | | |
| 12C | 40 | 3.4 | — | | | — | 8 | 8 | 8 | 8 | 7 | 7 | | | | | | |
| | RT | " | — | | | 8 | 8 | 8 | 8 | 7 | 6 | 6 | | | | | | |
| | 40°/RT | " | | | | — | 8 | 8 | 8 | 7 | 7 | 7 | | | | | | |
| 12D | 40° | " | 100% RDA/8 oz | | | — | 8 | 8 | 8 | 7 | 7 | 7 | | | | | | |
| | RT | " | " | | | 7½ CS | 7½ | 6 CC | 5½ CS | 5 | — | — | | | | | | |
| | 40°/RT | " | " | | | — | — | 6 | 5½ | 5 | — | — | | | | | | |

TABLE 1-continued

MONTHLY PRODUCT EVALUATION OF ASEPTIC PACKAGED MILK PRODUCT DURING STORAGE

| Example | Storage Temp °F. | % Fat In Milk | Pounds of TCP/200 gal | NOTES | Rating of Samples Months in Storage | | | | | | | | | | | | | |
|---|---|---|---|---|---|---|---|---|---|---|---|---|---|---|---|---|---|---|
| | | | | | 1 | 2 | 3 | 4 | 5 | 6 | 7 | 8 | 9 | 10 | 11 | 12 | 13 | 14 |
| | | | | | | | CC | CS | | | | | | | | | | |

TPC = Tricalcium phosphate
CS = Calcium settling
G = Gelation
NS = Not sweet
S = Sweet
B = Browning
FP = Fat particles
SSOC = Some settling out of calcium
VLH = Very little hydrolysis
FS = Fat separation
SB = Slight browning
CPOG = Calcium particles on glass
CCS = Cocoa and calcium settling
SF = Shaken first
CC = Calcium clumping
M = Musty
C = Cooked flavor
MF = Metallic flavor
VS = Very sweet
BC = Brownish color
SS = Slight settling
SD = Sediment on bottom For the sake of clarity, the results of the tests run on the products of these examples are compared in chart form in Table 2 as follows:

TABLE 2

Shelf Life of Aseptically Packaged Products

| Example | % Butterfat In Milk | % RDA Ca/ 8 oz product (if Ca fortified) | Lactase-Treated | Chocolate | Minimum Shelf Life |
|---|---|---|---|---|---|
| 1A | 3.40 | — | — | — | 10 months |
| 1B | 3.40 | 50+ | — | — | 11 months |
| 2A | 3.40 | 50+ | — | — | 10 months |
| 3A | 3.4 | — | yes | — | 8 months |
| 3B | 3.4 | 50+ | yes | — | 9 months |
| 4A | 3.4 | 50+ | yes | — | 11 months |
| 4B | 3.4 | — | yes | — | |
| 4C | 3.4 | 50+ | yes | — | 6 months |
| 5A | 3.4 | 50+ | yes | — | 10 months |
| 5B | 3.4 | — | yes | — | 9 months |
| 5C | 2.0 | 50+ | yes | — | 10 months |
| 6A | 2.1 | | yes | yes | 10 months |
| 6B | 2.1 | 50+ | yes | yes* | 9 months |
| 6C | 2.1 | 50+ | — | yes* | 6–8 months |
| 7A | 2.0 | 50+ | — | yes | 8 months |
| 7B | 2.0 | 50+ | yes | yes | 8 months |
| 8A | 2 | 50+ | — | — | 10 months |
| 9A | 2 | — | — | — | 11 months |
| 9B | 2 | 50+ | — | — | 6 months |
| 10A | 2 | — | yes | — | 7 months |
| 10B | 2 | 50+ | yes | — | 8 months |
| 11A** | 2 | — | yes | | 7 months |
| 11B | 2 | 50+ | yes | | 9 months |
| 12A | 2 | — | | | 7 months |
| 12B | 2 | 70 | | | 6 months |
| 12C | 3.4 | — | | | 7 months |
| 12D | 3.4 | 100 | | | 5 months |

*no gums added except for gum normally used to make a chocolate milk.
**packaged with no head space

CONCLUSION

This invention has been primarily addressed to the development of a highly saleable, consumer-acceptable, aseptically packaged calcium fortified milk product that will keep its good qualities for several months. In the practice of this invention it has been found that low fat milk, regular milk, lactase-treated low fat milk, lactase-treated whole milk, chocolate milk and lactase-treated chocolate milk can each be calcium-fortified to at least 500 mg of calcium/8 oz. of milk and then aseptically packaged to give a consumer acceptable product that will keep its good qualities for at least six months when stored either on a grocery shelf or on a refrigerator shelf. It has also been found that the calcium enriching of low fat milk or whole milk may be as much as 700–1000 mg calcium/8 oz of milk and give a consumer acceptable packaged product that will keep its good qualities for at least five months when stored either on a grocery shelf or on a refrigerator shelf.

In many of the foregoing examples, the product was aseptically packaged in 250 ml containers with 14 ml nitrogen headspace. In one example, the product was packaged with no headspace and the product was satisfactory. It is contemplated that headspace gas other than pure nitrogen might be used, such as compressed air or mixtures of nitrogen and oxygen. In the foregoing examples, the milk was subjected to indirect process UHT treatment but it is contemplated that direct UHT treatment could be also employed.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. An aseptically packaged calcium-fortified milk product providing about 400 mg–1000 mg of calcium per 8 oz. serving comprising liquid milk containing not less than 1% butterfat, an added edible, bland, water-insoluble calcium compound in finely divided form distributed therein, and 0.013%–0.027% of carrageenan and 0.0096%–0.0198% of guar gum each in hydrated form and uniformly distributed throughout the fluid milk as stabilizers, said percentages being by weight based on the weight of the fluid milk, the amounts and proportions of said gums being sufficient to render said aseptically packaged calcium-fortified milk substantially suspension-stable.

2. The fortified milk product of claim 1 wherein said calcium compound is selected from the group of salts consisting of calcium carbonate and a calcium phosphate.

3. The fortified milk product of claim 2 wherein said milk contains at least 2% fat, the carrageenan is a kappa carrageenan, and the amount of calcium salt is such than an 8 ounce serving of the fortified milk provides at least 50% of the U.S. R.D.A. of calcium.

4. An aseptically packaged calcium-fortified and phosphorus-fortified liquid milk product providing about 400 mg–1000 mg of calcium per 8 ounce serving comprising milk containing not less than 1% butterfat, an added edible, bland, water-insoluble calcium salt of a phosphorus-containing acid in finely divided particulate form distributed therein, and 0.013%–0.027% of carrageenan gum and 0.0096%–0.0198% of guar gum each in hydrated form and uniformly distributed throughout the milk as stabilizers, said percentages being by weight based on the weight of the liquid milk, the amounts and proportions of said gums being sufficient to render said fortified milk substantially suspension-stable.

5. The aseptically packaged fortified milk product of claim 4 in which said calcium salt is tricalcium phosphate.

6. The aseptically packaged fortified milk product of claim 5 in which said milk is whole milk.

7. The aseptically packaged fortified milk product of claim 5 in which said milk is partially defatted milk.

8. The aseptically packaged fortified milk product of claim 5 in which said milk is lactase treated whole milk.

9. The aseptically packaged fortified milk product of claim 5 in which said milk is lactase treated low fat milk.

10. The aseptically packaged fortified milk product of claim 5 in which said milk is chocolate milk.

11. An aseptically packaged calcium-fortified and phosphorus-fortified liquid milk product providing about 500 mg–1000 mg of calcium per 8 ounce serving comprising:
liquid milk containing not less than 1% butterfat;
0.26%–1.55% by weight based on the weight of the liquid milk of tricalcium phosphate in finely divided form distributed throughout the milk; and
0.013%–0.027% by weight based on the weight of said liquid milk of carrageenan and 0.0096%–0.0198% by weight based on the weight of said liquid milk of guar gum, said gums being in hydrated form and distributed uniformly throughout the milk, the amounts and proportions of said gums being sufficient to render said fortified milk substantially suspension-stable.

12. The aseptically packaged fortified milk of claim 11 wherein said milk contains at least 1% by weight of butterfat.

13. The aseptically packaged fortified milk of claim 12 wherein said carrageenan is a kappa carrageenan.

14. The aseptically packaged fortified milk of claim 13 wherein said carrageenan is present in an amount by weight that is at least 25% greater than the amount of said guar gum.

15. The aseptically packaged fortified milk of claim 14 wherein said tricalcium phosphate particles have maximum diameters predominantly not in excess of 44 micrometers.

16. The aseptically packaged fortified milk of claim 15 wherein the butterfat content of said milk is at least 3.25% by weight of said milk.

17. The aseptically packaged fortified milk of claim 13 wherein the amount of tricalcium phosphate present is sufficient that an 8 ounce serving of said fortified milk provides 70% of the U.S. Recommended Daily Allowance for calcium.

18. An aseptically packaged calcium-fortified and phosphorus-fortified liquid milk providing about 400 mg to 700 mg of calcium per 8 ounce serving product comprising:
low fat liquid milk containing not less than 1% butterfat;
0.26% to 0.55% by weight based on the weight of said liquid milk of tricalcium phosphate in finely divided form, wherein said tricalcium phosphate particles have maximum diameters of predominantly not in excess of 44 micrometers distributed throughout the milk; and
0.013%–0.027% by weight based on the weight of the fluid milk of a kappa carrageenan and 0.0096%–0.0198% by weight based on the weight of the milk of guar gum, said gums being distributed uniformly throughout the milk in hydrated form, the amounts and proportions of said gums being sufficient to render said fortified milk substantially suspension-stable.

19. The aseptically packaged fortified milk product of claim 18 wherein said milk contains at least 2% by weight of butterfat.

20. The aseptically packaged fortified milk product of claim 19 wherein said carrageenan is present in an amount by weight that is at least 20% greater than the amount of said guar gum.

21. The aseptically packaged fortified milk product of claim 20 wherein the amount of tricalcium phosphate present is sufficient that an 8 ounce serving of said fortified milk product provides at least 50% of the U.S. Recommended Daily Allowance for calcium.

22. The aseptically packaged fortified milk product of claim 19 comprising
0.019%–0.020% by weight based on the weight of said milk of said kappa carrageenan and 0.014%–0.016% by weight based on the weight of said milk of guar gum.

23. The aseptically packaged fortified milk product of claim 20 wherein said milk contains about 2% butterfat by weight, the amount of tricalcium phosphate present is sufficient that an 8 ounce serving of said fortified milk product provides at least 50% of the U.S. Recommended Daily Allowance for calcium, the amount of carrageenan is in the range 0.019% to 0.020%, and the amount of guar gum is in the range 0.014% to 0.016%.

24. The aseptically packaged fortified milk product of claim 23 wherein the amount of carrageenan is 0.0198% and the amount of carrageenan is 0.035% and the amount of guar gum is 0.015%.

25. An aseptically packaged calcium-fortified and phosphorus-fortified whole milk containing about 100% of the U.S. Recommended Daily Allowance of calcium in an 8 ounce serving comprising
0.50% to 0.55% by weight based on the weight of whole milk of tricalcium phosphate in finely divided form, having particle sizes that are predominantly not substantially in excess of 45 micrometers, distributed throughout the milk; and
about 0.019%–0.020% by weight based on the weight of said whole milk of a kappa carrageenan and about 0.014%–0.0167% by weight based on the weight of said whole milk of guar gum, said gums being in hydrated form and distributed throughout the milk, the amounts and proportions of said gums being sufficient if fully hydrated and uniformly distributed to render said fortified milk substantially suspension-stable.

26. A process for making aseptically packaged calcium-fortified liquid milk providing about 400 mg–1000 mg of calcium per 8 ounce serving comprising the steps of
(1) adding to and mixing with liquid milk, containing not less than 1% butterfat, an edible, bland, water-insoluble calcium compound in finely divided form; 0.013%–0.027% of carrageenan and 0.0969%–0.0198% of guar gum, the amounts and proportions of said gums if fully hydrated being sufficient to render said fortified milk substantially suspension-stable and so that said calcium compound, said carrageenan and said guar gum are distributed uniformly throughout the milk, said percentages being by weight based on the weight of the milk, and (2) subjecting the milk to UHT treatment wherein said carrageenan gum becomes fully hydrated, and
(3) filling the milk into containers under aseptic packaging conditions.

27. The process of claim 26 further comprising aseptically packaging so that the said containers have a gas filled headspace.

28. The process of claim 27 further comprising that said gas-filled headspace contains nitrogen gas.

29. The process of claim 26 wherein said carrageenan is a kappa carrageenan.

30. A process for making an aseptically packaged calcium-fortified and phosphorus-fortified milk providing about 500 mg–700 mg of calcium per 8 ounce serving comprising the steps of
(1) mixing 0.26%–0.55% edible, finely divided, insoluble tricalcium phosphate, 0.013%–0.027% carrageenan, and 0.0096%–0.0198% guar gum with liquid milk that contains not less than 1% butterfat, and mixing said materials under conditons such that said guar gum is hydrated,
(2) subjecting the milk to UHT treatment, and thereby hydrating said carrageenan, the amounts and proportions of said gums which are uniformly distributed throughout being sufficient to render said fortified liquid milk substantially suspension-stable, and then
(3) aseptically packaging the fortified milk.

31. The process of claim 29 which further comprises aseptically packaging with a gas filled headspace in the packages.

32. The process of claim 30 in which said tricalcium phosphate has particle sizes not substantially in excess of 44 micrometers.

33. The process of claim 30 wherein said carrageenan is a kappa carrageenan.

34. The process of claim 32 wherein said finely divided tricalcium phosphate, carrageenan, and guar gum are preblended together in powder form, then blended into a small amount of said milk to form a premix, and then said premix is blended into said milk.

35. A process for making a calcium-fortified and phosphorus-fortified fresh low fat liquid milk providing about 500–1000 mg of calcium per 8 ounce serving and containing about 2% by weight butterfat comprising the steps of
(1) forming a blend of dry, particulate, finely divided tricalcium phosphate, kappa carrageenan, and guar gum;
(2) adding said blended particulate material to a small amount of a fresh 2% butterfat milk and mixing to form a premix, the mixing being continued for a sufficient period of time to permit the guar gum to hydrate;
(3) blending the said premix with the desired volume of said fresh 2% butterfat milk such that the fortified liquid milk contains from 0.26% to 0.55% by weight of tricalcium phosphate, from 0.013% to 0.027% by weight of carrageenan, and from 0.0096% to 0.0198% by weight of guar gum, all percentages being based on the weight of the liquid milk;
(4) subjecting the milk to UHT treatment and thereby causing said carrageenan to hydrate, and
(5) aseptically packaging said fortified milk.

36. The process of claim 34 that further comprises that said aseptically packaging is done so that said packages each have a gas filled headspace.

37. The process of claim 35 that further comprises that said gas filled headspace is filled with nitrogen.

38. The process of claim 34 wherein the amount of said carrageenan is in the range 0.019%–0.02% and the amount of said guar gum is 0.014%–0.0160%.

39. The process of claim 37 wherein the amount of said carrageenan is 0.198% and the amount of said guar gum is 0.0150%.

40. A process for making an aseptically packaged calcium-fortified and phosphorus-fortified liquid whole milk providing about 500 mg–1000 mg of calcium per 8 ounce serving and containing at least 3.25% by weight butterfat comprising the steps of
(1) forming a blend of dry, particulate, finely divided tricalcium phosphate, kappa carrageenan, and guar gum;
(2) adding said blended particulate material to a small amount of whole milk containing at least 3.25% by weight of butterfat, and mixing to form a premix, the mixing being continued for a sufficient period of time to permit the guar gum to hydrate;
(3) blending the said premix with the desired volume of said whole milk such that the fortified milk contains from 0.26% to 0.55% by weight of tricalcium phosphate, from 0.013% to 0.027% by weight of carrageenan, and from 0.0096% to 0.0198% by weight of guar gum, all percentages being based on the weight of the liquid milk;
(4) subjecting the milk to UHT treatment and thereby causing said carrageenan to hydrate, and
(5) aseptically packaging said fortified milk.

41. The process of claim 39 that further comprises that said aseptically packaging is done so that said packages each have a gas filled headspace.

42. The process of claim 37 that further comprises that said gas filled headspace is filled with nitrogen.

43. The process of claim 36 wherein the amount of said carrageenan is in the range 0.019%–0.03% and the amount of said guar gum is 0.014%–0.0160%.

44. The process of claim 37 wherein the amount of said carrageenan is 0.198% and the amount of guar gum is 0.0150%.

45. The process of claim 34 in which said 2% butterfat milk has been lactase-treated.

46. The process of claim 34 in which said 2% butter fat milk is 2% butterfat chocolate milk.

47. The process of claim 39 in which said at least 3.25% whole milk has been lactase treated.

48. The process of claim 46 in which said 12% butterfat chocolate milk has been lactase treated.

* * * * *